US012583341B2

(12) United States Patent
Walzel et al.

(10) Patent No.: US 12,583,341 B2
(45) Date of Patent: Mar. 24, 2026

(54) METHOD FOR AUTOMATICALLY ESTABLISHING A PLUG-IN CONNECTION IN ORDER TO CHARGE ELECTRIC VEHICLES

(71) Applicant: Technische Universität Graz, Graz (AT)

(72) Inventors: Bernhard Walzel, Eggersdorf bei Graz (AT); Mario Hirz, Graz (AT); Helmut Brunner, Graz (AT)

(73) Assignee: Technische Universität Graz, Graz (AT)

( * ) Notice: Subject to any disclaimer, the term of this patent is extended or adjusted under 35 U.S.C. 154(b) by 1030 days.

(21) Appl. No.: 17/763,299

(22) PCT Filed: Sep. 30, 2020

(86) PCT No.: PCT/IB2020/059155
§ 371 (c)(1),
(2) Date: Apr. 5, 2022

(87) PCT Pub. No.: WO2021/064597
PCT Pub. Date: Apr. 8, 2021

(65) Prior Publication Data
US 2022/0363151 A1      Nov. 17, 2022

(30) Foreign Application Priority Data
Sep. 30, 2019    (DE) ..................... 10 2019 126 377.8

(51) Int. Cl.
*B60L 53/16* (2019.01)
*B60L 53/31* (2019.01)
(Continued)

(52) U.S. Cl.
CPC ............... *B60L 53/16* (2019.02); *B60L 53/31* (2019.02); *B60L 53/35* (2019.02);
(Continued)

(58) Field of Classification Search
CPC .......... B60L 53/16; B60L 53/35; B60L 53/31; H01R 13/6683; H01R 43/26; H01R 2201/26
See application file for complete search history.

(56) References Cited

U.S. PATENT DOCUMENTS 7,999,506 B1    8/2011  Hollar et al.
9,266,440 B2    2/2016  Gao et al.
        (Continued)

FOREIGN PATENT DOCUMENTS

CN        107618396 A      1/2018
DE    102009010120 A1      9/2010
        (Continued)

OTHER PUBLICATIONS

English-language Abstract for CN 107618396 A, Jan. 23, 2018.
        (Continued)

*Primary Examiner* — Jay Khandpur
(74) *Attorney, Agent, or Firm* — Tiajoloff & Kelly LLP

(57) ABSTRACT

In a method for automatically establishing a plug-in connection for charging electric vehicles, first the relative position between a free plug-in connector on a positioning head that can be moved in at least two spatial directions, and a permanently installed plug-in connector is determined by a position sensor. Then the free plug-in connector approaches the permanently installed plug-in connector until there is mechanical contact between interacting guide surfaces in an insertion position, and the free plug-in connector is moved into a plug-in position. The distance along a common plug-in axis between the guide surfaces decreases continuously during the plug-in process. The transverse forces occurring at the guide surfaces relative to the plug-in direction are detected by transverse-force sensors and the
(Continued)

Figure 1:
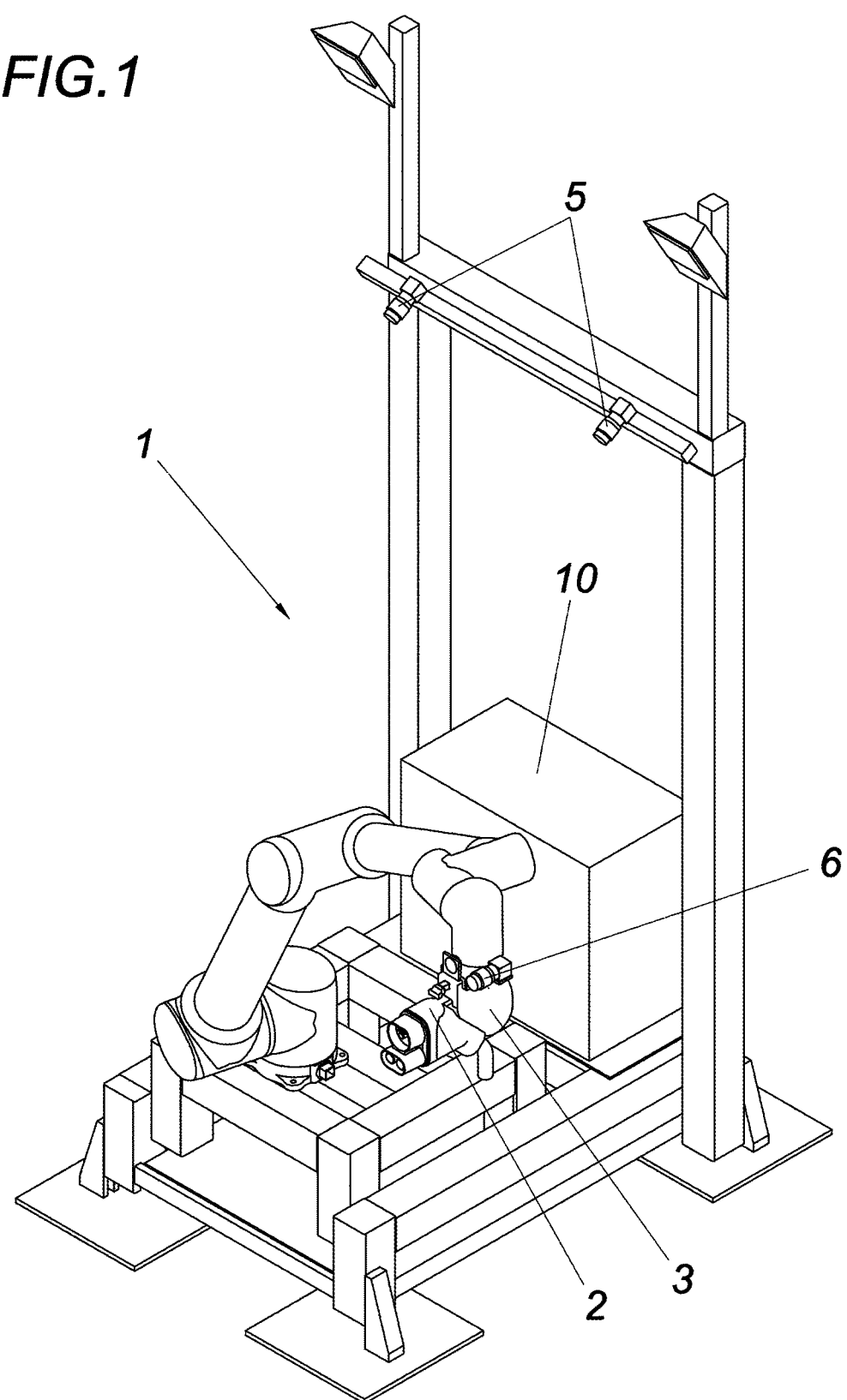

positioning head is moved transversely and/or about a transverse pivot axis, reducing these transverse forces.

15 Claims, 5 Drawing Sheets

(51) Int. Cl.
    *B60L 53/35*            (2019.01)
    *H01R 13/66*           (2006.01)
    *H01R 43/26*           (2006.01)

(52) U.S. Cl.
    CPC ......... *H01R 13/6683* (2013.01); *H01R 43/26*
                 (2013.01); *H01R 2201/26* (2013.01)

(56)             References Cited

U.S. PATENT DOCUMENTS

| | | | |
|---|---|---|---|
| 11,110,812 B2 | 9/2021 | Miller | |
| 2011/0171843 A1* | 7/2011 | Casses | B60L 53/16 |
| | | | 29/426.1 |
| 2013/0076902 A1 | 3/2013 | Gao et al. | |
| 2015/0210174 A1* | 7/2015 | Settele | B60L 53/35 |
| | | | 320/109 |
| 2017/0008411 A1 | 1/2017 | Wu | |
| 2017/0112355 A1 | 4/2017 | Hirota et al. | |
| 2019/0135133 A1 | 5/2019 | Miller | |
| 2020/0361331 A1 | 11/2020 | Shin | |
| 2021/0001736 A1 | 1/2021 | Schoob et al. | |
| 2022/0212555 A1* | 7/2022 | Zhang | H02J 7/00032 |

FOREIGN PATENT DOCUMENTS

| | | |
|---|---|---|
| DE | 202012003577 A1 | 8/2012 |
| DE | 102012216980 A1 | 4/2013 |
| DE | 102012014936 A1 | 1/2014 |
| DE | 102016207767 A1 | 11/2017 |
| DE | 102018104759 A1 | 9/2019 |
| JP | 201150177 A | 3/2011 |
| WO | 2014/015991 A2 | 1/2014 |
| WO | 2015/112355 A1 | 7/2015 |
| WO | 2017/209735 A2 | 12/2017 |
| WO | 2019/139463 A2 | 7/2019 |

OTHER PUBLICATIONS

English-language Abstract for DE 10 2009 010120 A1, Sep. 2, 2010.
English-language Abstract for JP 201150177 A, Mar. 10, 2011.

* cited by examiner

METHOD FOR AUTOMATICALLY ESTABLISHING A PLUG-IN CONNECTION IN ORDER TO CHARGE ELECTRIC VEHICLES

FIELD OF THE INVENTION

The invention relates to a method for automatically establishing a plug-in connection for charging electric vehicles, wherein first the relative position between a free plug-in connector, which is arranged on a positioning head displaceable in at least two spatial directions, and a permanently installed plug-in connector is determined by a position sensor that detects the positioning head and the permanently installed plug-in connector, whereupon the free plug-in connector approaches the permanently installed plug-in connector until there is mechanical contact between interacting guide surfaces of the two plug-in connectors in an insertion position, and the free plug-in connector is moved, by means of the positioning head, in the plug-in direction into a plug-in position.

DESCRIPTION OF THE PRIOR ART

For the automated charging process of electric vehicles, several methods are known from the prior art that describe a positioning unit as well as a positioning head to the end of which a plug-in connector is attached. Such systems are shown for example in DE102016207767A1 or U.S. Pat. No. 7,999,506B1 and comprise a parallel kinematics system as a positioning unit with several degrees of freedom, to which a charging connector is attached, and a position sensor such as a camera or a LIDAR system to enable location determination of the connector and the parallel kinematics system.

However, a disadvantage of the known automated charging systems is that the positioning units used have to meet extremely high requirements not only in terms of their mechanical components but also in terms of the sensors and controllers used, since even minor misalignments of the plug-in connectors with respect to each other can prevent a successful mating process or even damage the plug-in connectors. To avoid the latter, existing positioning units are force-limited so that if a predefined mating force is exceeded, the mating process and thus the loading process is aborted. Although this avoids damage to the vehicle and the charging system, it reduces the reliability of the automatic charging process. Due to the resulting difficulties in precisely aligning the plug-in connectors, such positioning units are generally very expensive and therefore not suitable for mass production, as would be required for the automotive industry.

SUMMARY OF THE INVENTION

The invention is thus based on the object of designing a device of the type described above in such a way that reproducibly reliable plug-in connections can be produced despite the use of a small number of components suitable for series production.

The invention solves the problem in that the distance between the guide surfaces relating to a common plug-in axis of the plug-in connectors decreases continuously during the plug-in process, in that transverse forces occurring at the guide surfaces relative to the plug-in direction are detected by transverse-force sensors, and the positioning head is moved transversely to the plug-in direction and/or about a pivot axis extending transversely to the plug-in direction while minimizing these transverse forces. Since this is a method for automatically establishing a plug-in connection for charging electric vehicles, the permanently installed plug-in connector can be the charging socket of an electric or hybrid vehicle, and the free plug-in connector can be a charging plug. In a first step, the positioning head is moved closer to the permanently installed plug-in connector using the position sensor. As soon as physical contact between the plug-in connectors is registered by means of the transverse-force sensors and the guide surfaces interact, the insertion position is reached. Both plug-in connectors have guide surfaces which, when both plug-in connectors are in physical contact, are intended to make it easier to establish the plug-in connection through a predetermined path in that the guide surfaces restrict lateral movements of the plug-in connectors relative to each other and guide the contact points, for example electrical poles, towards each other when the two connectors approach each other. This means that the free plug-in connector is now moved in the mating direction while minimizing the lateral forces acting on it.

As soon as the two plug-in connectors have been brought close together along the mating direction to such an extent that a functional plug-in connection is established, the mating position is reached. The transverse forces detected are used here as the basis for adjusting the holding forces and aligning the positioning head. Since the distance between the guide surfaces decreases continuously during the mating process, it is easier to achieve the insertion position than with a purely parallel arrangement of the guide surfaces. In this way, the insertion position can be reached even if the two plug-in connectors are not aligned in parallel. In the application according to the invention, the free plug-in connector is displaced from the insertion position to the mating position relative to the permanently installed plug-in connector until the transverse forces measured by the transverse-force sensors are above a predetermined limit, after which the free plug-in connector is realigned transversely to the mating direction while minimizing the measured transverse forces, and the process is continued. As long as the measured transverse forces are below the limit, the mating position can be achieved by applying greater force in the direction of the plug-in axis without damaging the components involved. The design of the guide surfaces in terms of inclination and geometry is related to the change in transverse forces in the mating direction, which can influence the sensitivity of the regulation. For example, in the case of more inclined, or concave, design of the guide surfaces, greater transverse forces act for the same deflection in the mating direction than in the case of flatter, or linear, embodiments. It goes without saying that the transverse forces should not exceed the forces exerted in the mating direction, as would be the case, for example, with embodiments whose inclination exceeds 45°. In such an embodiment, the defined limit for the transverse forces would be reached very quickly without significantly moving the free charging plug in the direction of the permanently installed charging plug, or such high transverse force limits would be necessary that the components involved would be unnecessarily stressed in the long term.

The transverse forces occurring at the guide surfaces can be minimized in a particularly simple manner, wedging of the plug-in connectors can be avoided and thus the production of the plug-in connection can be facilitated if a plug-in connector with adjustable stiffness is mounted in a floating manner, wherein the stiffness of the bearing is reduced to a soft bearing position when a first transverse force limit value is exceeded and is increased to a hard bearing position when a second transverse force limit value is not reached. The stiffness refers to the compliance with deflection in one direction and thus the restoring force as a function of the deflection. The hard bearing position facilitates correct positioning and the application of the required insertion forces, while the soft bearing position allows the plug-in connectors to yield in such a way that the plug-in connectors are automatically aligned with each other along the guide surfaces without the need for active regulation. Due to the greater design flexibility, it is advisable for the free plug-in connector to have a floating bearing with adjustable stiffness. The floating bearing can be provided between the positioning head and the free plug-in connector or between the positioning head and the positioning arm supporting the positioning head. If the positioning arm comprises several joints, a floating bearing of the free plug-in connector may also be provided in these joints. In a preferred embodiment, a hard bearing position is specified until the insertion position is reached, and a soft bearing position is specified after the insertion position is reached and until the mating position is reached. Particularly simple regulating conditions result in this context if the first lateral force limit value corresponds to the second lateral force limit value.

Particularly favorable guiding conditions result for conventional plug-in connectors if a plug-in connector is mounted in a floating manner with a stiffness of 1-3 N/mm transverse to the plug-in axis and/or along the plug-in axis with a stiffness of at least 1 N/mm and/or a torsional stiffness of at most 2 Nm/degree in the soft bearing position. In the hard bearing position, the plug-in connector can be floatingly mounted with a stiffness of at least 3 N/mm and/or a torsional stiffness of at least 2 Nm/degree.

Excessive material stress due to high forces in the mating direction during the automated loading process can be avoided by providing a contact force sensor for detecting the contact forces occurring in the direction of the plug-in axis (S) and terminating the mating process when a predefined contact force limit value is exceeded. In particular for reaching the mating position, higher forces are exerted on the plug-in connectors in the direction of the plug-in axis than during the preceding process steps. The contact force sensor can be used to set a defined contact force limit value which, on the one hand, makes it possible to produce a plug-in connection in accordance with the invention but, on the other hand, prevents excessive forces from being exerted on the plug-in connectors. The transverse-force sensor and the contact force sensor can be designed as a common sensor.

The position sensor requires a relatively large spatial range to detect the positioning head and the permanently installed plug-in connector, since the permanently installed plug-in connector, such as in a vehicle, is not located in the immediate vicinity of the positioning head. Such a large spatial range, however, comes at the expense of detection accuracy while keeping costs constant. According to the invention, it is therefore proposed that the positioning head is displaced on the basis of the relative position determined with the aid of the position sensor in such a way that the permanently installed plug-in connector is located in the detection range of a second alignment sensor arranged on the positioning head, after which the free plug-in connector is displaced into the insertion position on the basis of the relative position values of the alignment sensor. Thus, the position sensor is designed only more for large spatial detection of the components and the alignment sensor only at short range, but with greater precision. On the one hand, this reduces costs, and, on the other hand, different sensor types can be combined depending on the application. For example, an inductive alignment sensor can be provided in an advantageous manner due to the electrically conductive connection elements.

For carrying out the method according to the invention, a device is proposed in which the positioning unit has transverse-force sensors for the positioning head and in which each plug-in connector has at least one guide surface whose distance from a cooperating guide surface of the respective other plug-in connector, relating to a common plug-in axis of the plug-in connectors, decreases continuously from the insertion position to the plug-in position. The positioning unit can displace the free plug-in connector in two, and in a particularly preferred embodiment in three, spatial directions. The interaction of the positioning unit and the sensor system with the specialized control circuit described above makes the automated mating process feasible, and it can be ensured that the positioning unit can displace the free plug-in connector in such a way that a mating connection is made possible only by means of the sensed data relating to the transverse forces acting on the plug-in connectors and their relative position with respect to one another. This can be accomplished without the use of expensive and complex components, since the required measuring and positioning tolerances can be kept relatively high. In its simplest form, the positioning head serves only to secure the free plug-in connector, but it can also be designed as a gripper or similar manipulation tool. Depending on the embodiment, the positioning head may include the alignment sensor in addition to the free plug-in connector. The position sensor can be arranged either independently of the positioning unit or on the positioning unit in such a way that it can locate both the positioning head and the permanently installed plug-in connector, as well as their relative position to each other, in its detection range. The position sensor may be an optical or other type of sensor, such as a LIDAR, or a microwave sensor. The alignment sensor may be such that it detects the relative position of the two plug-in connectors over relatively short distances. Each plug-in connector has at least one guide surface whose distance from a cooperating guide surface of the other plug-in connector relative to a common plug-in axis of the plug-in connectors decreases continuously from the insertion position to the mating position. In the simplest case, the distance can decrease linearly. Other embodiments are also conceivable, for example those in which the distance from a cooperating guide surface of the respective other plug-in connector decreases non-linearly from the insertion position to the mating position in relation to a common plug-in axis of the plug-in connectors.

In order to minimize the transverse forces occurring during the production of the plug-in connection, to enable automatic alignment of the plug-in connectors to one another and nevertheless to transmit the forces required for the plug-in connection, it is proposed that a plug-in connector is floatingly mounted so that it can pivot with adjustable stiffness transversely to the plug-in axis and/or about a pivot axis extending transversely to the plug-in axis. Such a floating bearing can be provided, for example, by means of a spring and/or a rubber element, wherein it is possible, for example, to specify different stiffnesses in different bearing positions by positioning the spring and/or the rubber element. The positioning can be carried out hydraulically, pneumatically or with the aid of an electric actuator, for example. Stiffness can also be set by optionally locking or releasing bearings connected in series. In principle, it does not matter where the respective plug-in connector is floatingly mounted. For example, this can be done on the positioning head or on a positioning arm supporting the positioning head.

Particularly favorable guiding conditions are obtained if the floating bearing has a soft bearing position with a stiffness of 1-3 N/mm transverse to the plug-in axis and/or a stiffness of at least 1 N/mm along the plug-in axis and/or a torsional stiffness of at most 2 Nm/degree. In a hard bearing position, the floating bearing can have a stiffness of at least 3 N/mm and/or a torsional stiffness of at least 2 Nm/degree.

In order to enable an automated mating process with a large number of connector types, it is proposed that the alignment sensor and the transverse-force sensors are connected to a control unit for the positioning unit and that the control unit is connected to a memory for geometry data sets of different plug-in connectors for regulating the positioning unit as a function of the measured values detected by the alignment sensor and the transverse-force sensor. Each connector type is assigned a separate geometry data set that is specific to that connector type and comprises information relating to the guide surfaces of the plug-in connectors, such as their length, thickness, surface roughness, stiffness and inclination. Since the transverse forces acting on a plug-in connector during mating depend on its geometry, these geometry data sets can be used to determine and apply the control forces that compensate for the transverse forces acting to achieve the mated position. The control loop can store geometry data sets of different connector types in such a way that geometry data sets can also be added to the memory subsequently. The connector type can be detected, for example, with the aid of an optical position sensor, after which the corresponding geometry data set is retrieved from the memory and the information it contains is used for regulation.

Since prior art connectors do not have a reduction in the distance of the guide surfaces along the plug-in axis, modifications are required. In order to keep these modifications small, it is proposed that the guide surfaces of at least one plug-in connector are inclined at an angle of between 1.5 and 4° to the plug-in axis. The main advantage of this embodiment is, above all, that existing connectors can be easily modified, wherein complex manufacturing steps can be dispensed with. In an advantageous embodiment of the invention, only the guide surfaces of the free plug-in connector can be inclined between 1.5 and 4° in the plug-in direction towards the plug-in axis, in order to avoid subsequent manufacturing measures on the permanently installed plug-in connector. This avoids, for example, adapting the charging socket of each electric car to be charged when the free charging connector of the device according to the invention is modified. In addition, the inclination of the guide surfaces at any time during the plugging process can ensure a simpler alignment of the two plugs from the insertion position to the plug-in position, allowing the regulation to be adapted to the given sensitivity of the sensors.

In order to simplify the automated achievement of the insertion position by means of manufacturing measures, it is proposed that the radially outermost boundary surfaces of a plug-in connector form a guide surface. In this embodiment, the clearance between the plug-in connectors in the insertion position is increased, reducing the precision requirements on the positioning unit and in particular on the control loop when the plug-in connectors are approached. By designing the connector face as a guide surface, on the one hand the required modifications to existing connectors are minimized, since no additional elements or frames need to be applied, and on the other hand the connector cross-section is kept small, which allows more precise positioning by the positioning unit, since the sensing area of the sensor placed on the positioning unit contains fewer blind spots.

In a more complex design of the connector face, displacement in the mating position can be facilitated by a plug-in connector having a circumferential guide spring which projects in the direction of the plug-in axis and tapers in cross-section and whose inner and outer side walls each form a guide surface. Since the plug-in connectors may have several guide surfaces, it is advantageous to design the outer and the inner side wall of a plug-in connector as a guide surface so that the advantages of a tapered design described above are retained when the guide spring interacts with more than one guide surface of the other plug-in connector.

BRIEF DESCRIPTION OF THE INVENTION

Figure 2:
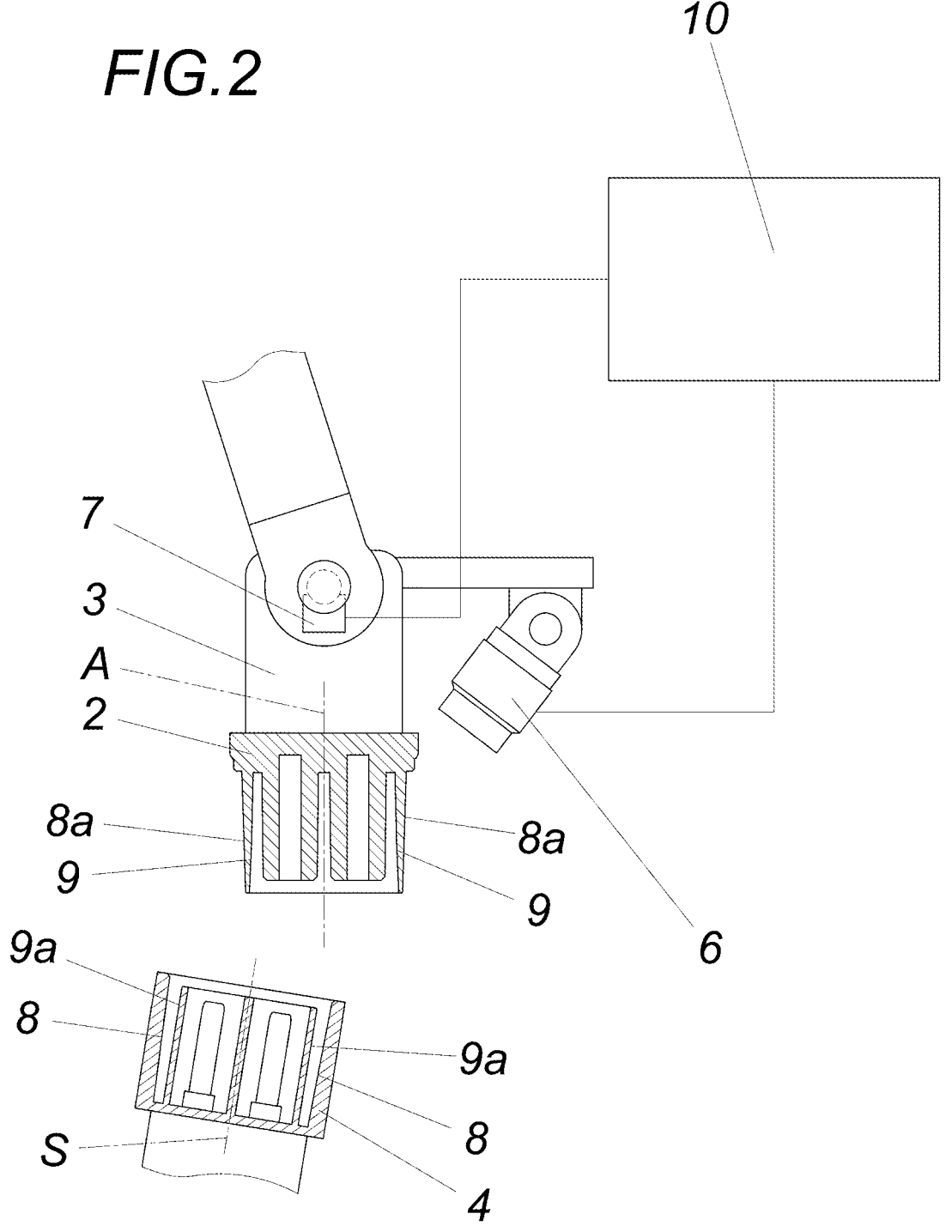
Figure 3:
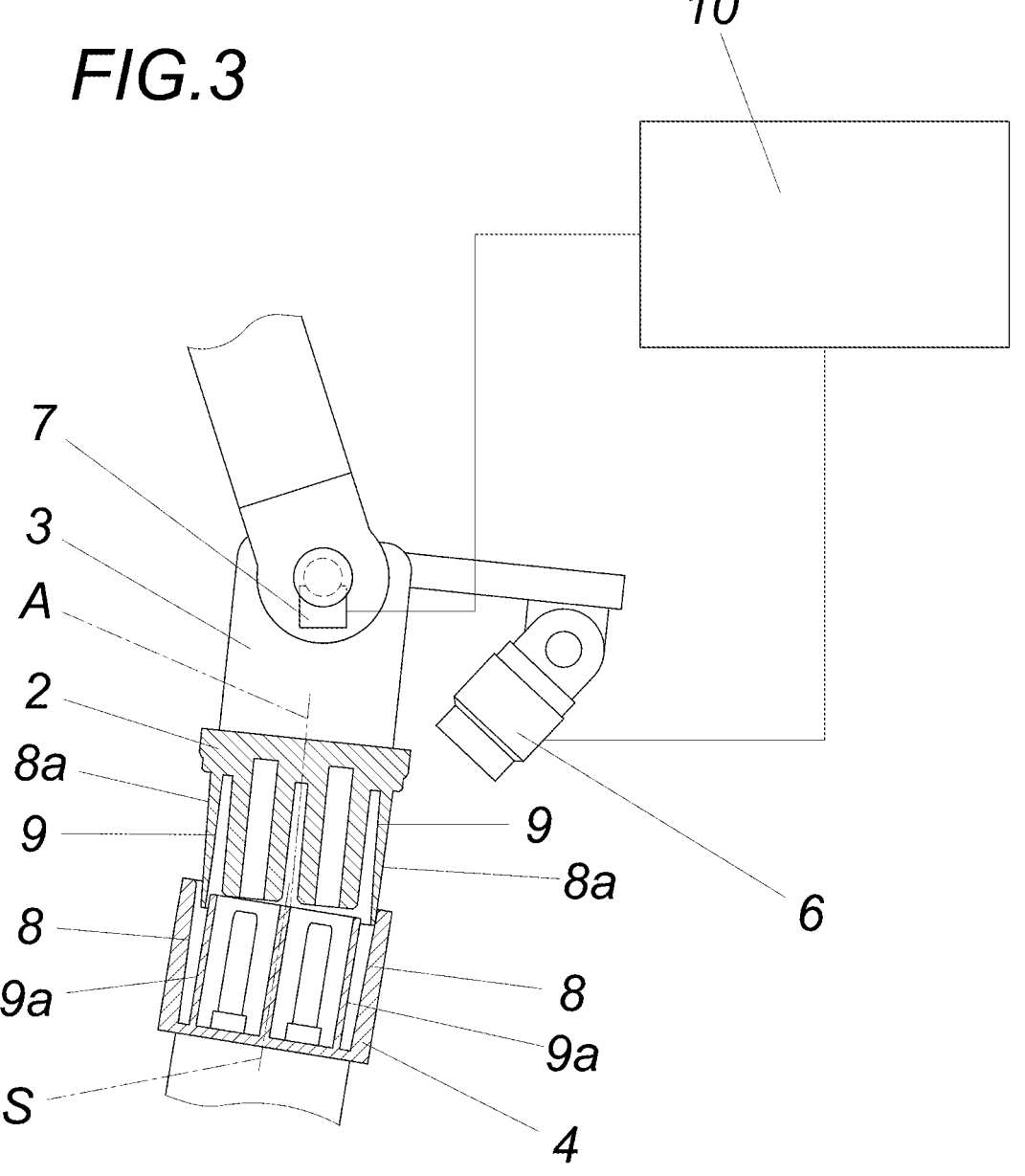
Figure 4:
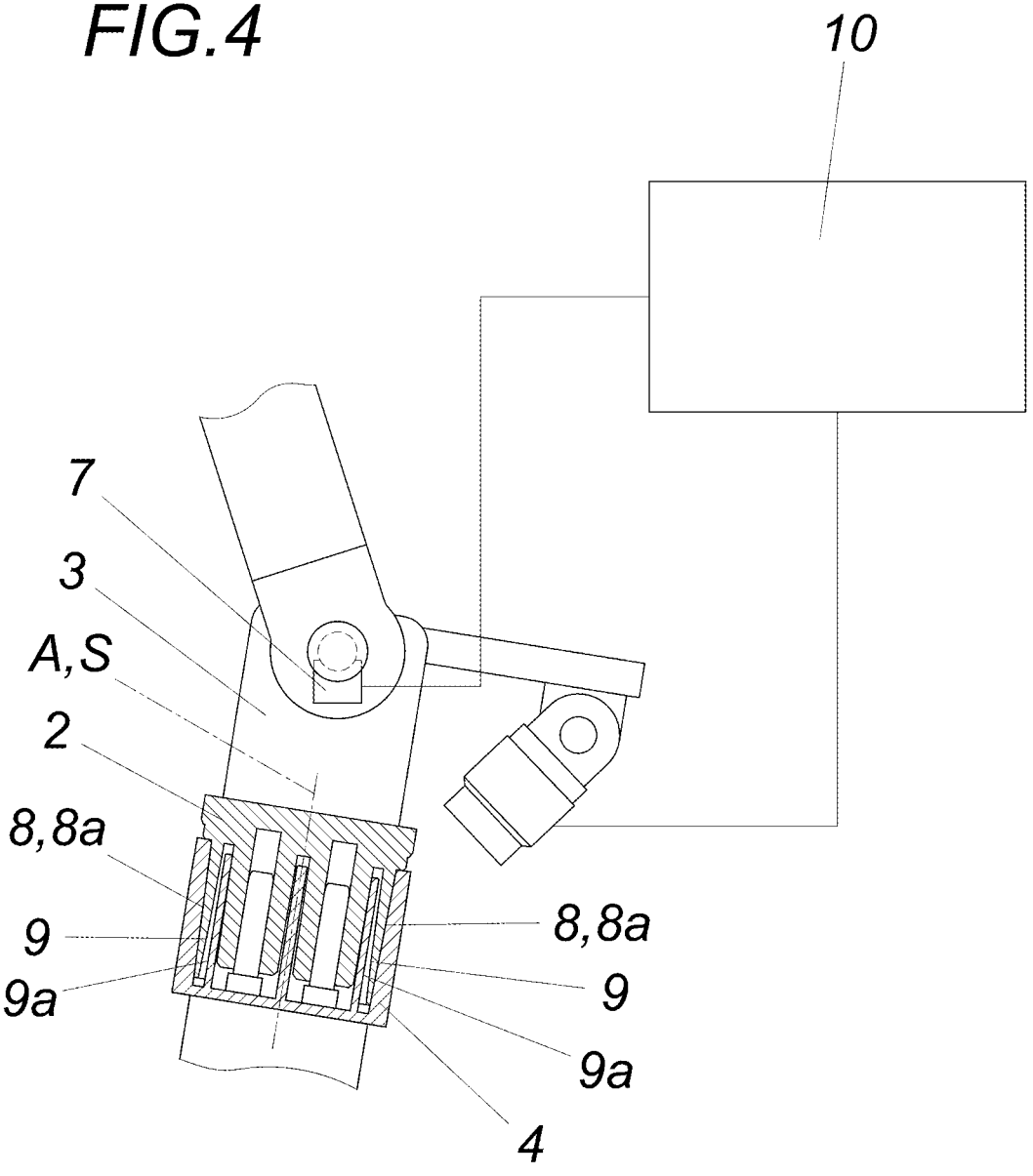
Figure 5:
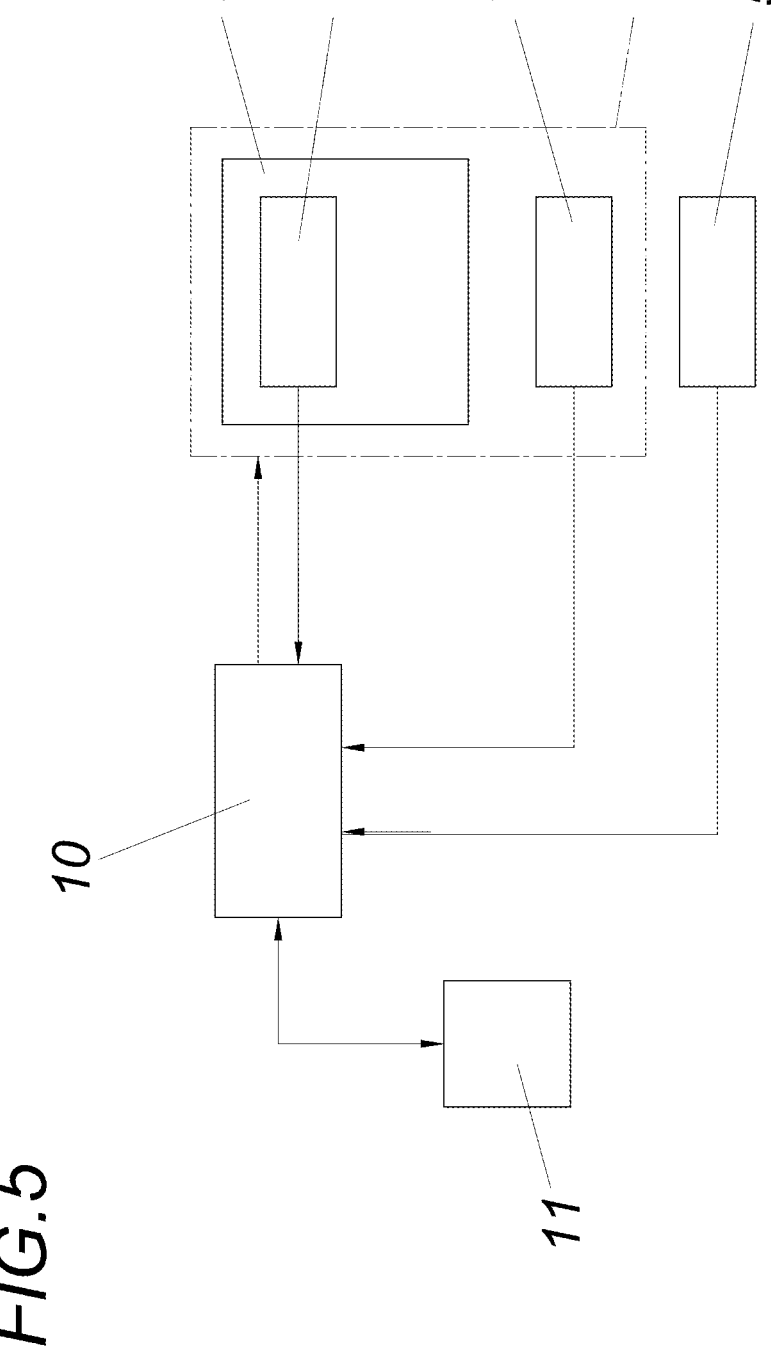

In the drawing, the subject matter of the invention is shown by way of example, wherein:

FIG. 1 shows a perspective view of an embodiment of the positioning unit,

FIG. 2 shows a schematic cross-section of the positioning head and the permanently installed plug-in connector before reaching the insertion position on a larger scale, FIG. 3 shows a cross-section corresponding to FIG. 2 in the insertion position, FIG. 4 shows a cross-section corresponding to FIGS. 2 and 3 in the plug-in position, and FIG. 5 shows a schematic block diagram of a device according to the invention.

DETAILED DESCRIPTION OF THE PREFERRED EMBODIMENTS

A device according to the invention comprises a positioning unit 1, which has a free plug-in connector 2 on a positioning head 3 that can be displaced in three spatial directions. To establish a plug-in connection, the positioning head 3 is brought closer to the permanently installed plug-in connector 4, for which purpose the initial relative position of the free plug-in connector 2 with respect to the permanently installed plug-in connector 4 is determined via at least one position sensor 5. The positioning head 3 has an alignment sensor 6, which determines the relative position of both connectors after the initial approach of the positioning head 3 to the permanently installed plug-in connector 4. The alignment sensor 6 detects a smaller spatial range compared to the position sensor 5, but has a higher positioning accuracy for reaching the insertion position. Transverse-force sensors 7 in the positioning unit 1 allow forces lateral to the alignment axis A of the positioning head 3 to be measured. The device can further comprise a contact sensor not shown in the figure. In order to facilitate the plug-in process even in the case of installed components with relatively low sensitivity, a plug-in connector 2, 4 has at least one guide surface 8, 9 whose distance from a cooperating guide surface of the respective other plug-in connector 8a, 9a relative to a common plug-in axis of the plug-in connectors decreases continuously from the insertion position towards the plug-in position. In a particularly preferred embodiment, the guide surfaces of at least one plug-in connector are inclined to the plug-in axis by between 1.5 and 4°.

The device according to the invention also has a control unit 10 which, on the one hand, evaluates the relative positions of the free plug-in connector 2 and the permanently installed plug-in connector 4 determined by the position sensor 5 and the alignment sensor 6 and, on the other hand, evaluates the data from the transverse-force sensors 7. Based on this data, the control unit 10 calculates step-by-step, by forming a control loop, the forces necessary to achieve the mating position, which must be exerted by the positioning unit 1 on the free plug-in connector 2. Since the transverse forces that act depend on the geometry of the plug-in connectors, geometry data records for the respective plug-in connectors can be stored in a memory 11 connected to the control unit 10.

The possible orientations of the plug-in connectors 2, 4 relative to each other and their positions can be seen in FIGS. 2 to 4:

FIG. 2 shows a possible alignment of the two plug-in connectors 2, 4 after the control unit 10 has calculated from the data of the position sensor 5 how the positioning unit 1 must displace the free plug-in connector 2 in order to bring the free plug-in connector 2 closer to the permanently installed plug-in connector 4. Since there is no physical contact between the two plug-in connectors 2, 4, the transverse-force sensor 7 does not provide any data useful for regulation to the control unit 10. The alignment axis A of the free plug-in connector 2 is generally not congruent with the common plug-in axis S of the permanently installed plug-in connector 4. The free plug-in connector 2 may be connected to the positioning head 3 via a floating bearing, not shown in more detail, which in the orientation shown is in a soft bearing position to avoid any damage and which is switched to a hard bearing position during the approach of the free plug-in connector 2 to the permanently installed plug-in connector 4 to facilitate the positioning of the free plug-in connector 2.

FIG. 3 shows the insertion position. To achieve this, the control unit 10 uses the data from the alignment sensor 6 to calculate how the positioning unit 1 must align and move the free plug-in connector 2 to bring the free plug-in connector 2 closer to the permanently installed plug-in connector 4 until there is physical contact between them and the insertion position is thus achieved. The physical contact of the two plug-in connectors 2, 4 can be detected by the transverse-force sensor 7 if the alignment axis A of the free plug-in connector 2 in the insertion position is not congruent with the common plug-in axis S in the general case. In order to facilitate the mating process after the insertion position has been reached and to prevent any tilting of the plug-in connectors 2, 4 relative to one another by the plug-in connectors 2, 4 aligning themselves automatically via the guide surfaces 8, 8a, 9, 9a, the floating bearing of the free plug-in connector can be switched back to a soft bearing position which has a lower section modulus than the hard bearing position.

FIG. 4 shows the plug-in position. After the insertion position, the free plug-in connector 2 is gradually brought closer to the permanently installed plug-in connector 4 by the positioning unit 1 via the signals of the transverse-force sensor 7 processed by the control unit 10. When the alignment axis A is congruent with the plug-in axis S, i.e. when the free plug-in connector 2 and the permanently installed plug-in connector 4 are aligned along the common plug-in axis S, no more lateral forces are detected by the lateral force sensor 7. If, in addition, no further approach in the mating direction is possible, the automated mating process is successfully completed.

FIG. 5 shows a schematic block diagram of the components according to the invention to better illustrate the method. Using the data about the spatial position of the positioning head 3 determined by the position sensor 5, the control unit 10 calculates the necessary steps for bringing the positioning head 3 closer to the permanently installed plug-in connector 4 by the positioning unit 1. The alignment sensor 6, which is also located on the positioning head 3, transmits data on the immediate spatial position of the positioning head 3 relative to the permanently installed plug-in connector 4 to the control unit 10, which uses this data to align and displace the positioning head 3 so that the insertion position is achieved. The data from the transverse-force sensor 7 can also be used for this purpose. To reach the plug-in position, the transverse-force sensor 7 arranged on the positioning unit 1 registers transverse forces acting on the positioning head 3 and sends corresponding data to the control unit 10, which in turn processes this data for further bearing and alignment of the positioning head 3 in the plug-in direction. This is done step by step, so that once the insertion position has been reached, the free plug-in connector 2 is displaced along the alignment axis A in the direction of the permanently installed plug-in connector 4 to reach the plug-in position. If the alignment axis A is not congruent with the plug-in axis S, transverse forces occurring on the guide surfaces during the course of the displacement act on the free plug-in connector 2. If these transverse forces measured by the transverse-force sensor 7 exceed a predetermined limit, the approach is temporarily stopped and the positioning unit 1 realigns the positioning head 3 so that the alignment axis A changes. The commands required for realignment are sent from the control unit 10 to the positioning unit 1 using the data transmitted from the lateral force sensor 7 to the control unit 10. As soon as a minimum of transverse forces on the free plug-in connector 2 is measured by the realignment, the approach is continued. These steps are repeated until the alignment axis A is congruent with the plug-in axis S, which means that no more transverse forces on the free plug-in connector 2 are measured by the transverse-force sensor 7 and further displacement in the direction of the plug-in axis becomes impossible, so that the mating position is reached. As will be explained in more detail above, the control unit 10 can be connected to a memory 11 for improving the regulation, from which geometry data sets for the plug-in connectors detected with the aid of the position sensor 5, for example, can be retrieved.

The invention claimed is:

1. A method for automatically establishing a plug-in connection for charging electric vehicles, said method comprising:

determining first a relative position between a free plug-in connector, which is arranged on a positioning head displaceable in at least two spatial directions, and a permanently installed plug-in connector by a position sensor that detects the positioning head and the permanently installed plug-in connector;

causing the free plug-in connector to approach the permanently installed plug-in connector until there is mechanical contact between interacting guide surfaces of the free plug-in connector and the permanently installed plug-in connector in an insertion position, and performing a plug-in process in which the free plug-in connector is moved by the positioning head, in a plug-in direction into a plug-in position;

wherein a distance between the guide surfaces along a common plug-in axis of the plug-in connector decreases continuously during the plug-in process;

detecting transverse forces occurring at the guide surfaces relative to the plug-in direction by transverse-force sensors; and moving the positioning head transversely to the plug-in direction and/or about a pivot axis extending transversely to the plug-in direction so as to reduce the transverse forces;

wherein one of the plug-in connectors is mounted with a floating bearing with adjustable stiffness, wherein the stiffness of the bearing is reduced to a soft bearing condition when the transverse force exceeds a first lateral force limit value, and is increased to a hard bearing condition when the transverse force is below a second lateral force limit value.

2. The method according to claim 1, wherein the plug-in connector is floatingly mounted in the soft bearing condition transverse to the plug-in axis with a stiffness of 1-3 N/mm, along the plug-in axis with a stiffness of at least 1 N/mm and a torsional stiffness of at most 2 Nm/degree or in the hard bearing condition with a stiffness of at least 3 N/mm and a torsional stiffness of at least 2 Nm/degree.

3. The method according to claim 2, wherein a contact force sensor detects a contact force occurring in a direction of the plug-in axis, and the plug-in process is terminated when the contact force exceeds a predetermined contact force limit value.

4. The method according to claim 3, wherein the positioning head is displaced based on the relative position determined with the position sensor in such a way that the permanently installed plug-in connector is located in a detection range of an alignment sensor arranged on the positioning head, whereupon the free plug-in connector is displaced into the insertion position based on relative position values of the alignment sensor.

5. The method according to claim 2, wherein the positioning head is displaced based on the relative position determined with the position sensor in such a way that the permanently installed plug-in connector is located in a detection range of an alignment sensor arranged on the positioning head, whereupon the free plug-in connector is displaced into the insertion position based on relative position values of the alignment sensor.

6. The method according to claim 1, wherein a contact force sensor detects a contact force occurring in a direction of the plug-in axis, and the plug-in process is terminated when the contact force exceeds a predetermined contact force limit value.

7. The method according to claim 6, wherein the positioning head is displaced based on the relative position determined with the position sensor in such a way that the permanently installed plug-in connector is located in a detection range of an alignment sensor arranged on the positioning head, whereupon the free plug-in connector is displaced into the insertion position based on relative position values of the alignment sensor.

8. The method according to claim 1, wherein the positioning head is displaced based on the relative position determined with the position sensor in such a way that the permanently installed plug-in connector is located in a detection range of an alignment sensor arranged on the positioning head, whereupon the free plug-in connector is displaced into the insertion position based on relative position values of the alignment sensor.

9. A device for automatically establishing a plug-in connection for charging electric vehicles, said device comprising:

a positioning unit that has a positioning head that is supported for displacement in at least two spatial directions and has a free plug-in connector and an alignment sensor supported thereon, and a position sensor determining a position of the positioning head relative to a permanently installed plug-in connector;

wherein the positioning unit has transverse-force sensors operatively associated with the positioning head, and wherein each of the free plug-in connectors has at least one respective guide surface with a distance from a cooperating guide surface of the other plug-in connector along a common plug-in axis of the plug-in connectors decreases continuously from an insertion position towards a plug-in position; and wherein one of the plug-in connectors is mounted so as to be pivotable with adjustable stiffness transversely to the plug-in axis and/or about a pivot axis extending transversely to the plug-in axis.

10. The device according to claim 9, wherein said plug-in connector is supported on a floating bearing that has a soft bearing condition with a stiffness of 1-3 N/mm transverse to the plug-in axis, a stiffness of at least 1 N/mm along the plug-in axis and a torsional stiffness of at most 2 Nm/degree and/or a hard bearing condition with a stiffness of at least 3 N/mm and a torsional stiffness of at least 2 Nm/degree.

11. The device according to claim 9, wherein the alignment sensor and the transverse-force sensors are connected to a control unit controlling operation of the positioning unit, and wherein the control unit is connected to a memory storing geometry data sets of different plug-in connectors and regulates the positioning unit as a function of measured values detected by the alignment sensor and the transverse-force sensors.

12. A device for automatically establishing a plug-in connection for charging electric vehicles, said device comprising:

a positioning unit that has a positioning head that is supported for displacement in at least two spatial directions and has a free plug-in connector and an alignment sensor supported thereon, and a position sensor determining a position of the positioning head relative to a permanently installed plug-in connector;

wherein the positioning unit has transverse-force sensors operatively associated with the positioning head, and wherein each of the free plug-in connectors has at least one respective guide surface with a distance from a cooperating guide surface of the other plug-in connector along a common plug-in axis of the plug-in connectors decreases continuously from an insertion position towards a plug-in position; and wherein the alignment sensor and the transverse-force sensors are connected to a control unit controlling operation of the positioning unit, and wherein the control unit is connected to a memory storing geometry data sets of different plug-in connectors and regulates the positioning unit as a function of measured values detected by the alignment sensor and the transverse-force sensors.

13. The device according to claim 12, wherein the radially outermost boundary surfaces of the free plug-in connector with respect to the common plug-in axis form a guide surface.

14. The device according to claim 12, wherein one of the plug-in connectors has a circumferential guide spring that projects in a direction of the common plug-in axis and tapers in cross-section and has inner and outer side walls that each form a guide surface.

15. A device for automatically establishing a plug-in connection for charging electric vehicles, said device comprising:

a positioning unit that has a positioning head that is supported for displacement in at least two spatial directions and has a free plug-in connector and an alignment sensor supported thereon, and a position sensor determining a position of the positioning head relative to a permanently installed plug-in connector;

wherein the positioning unit has transverse-force sensors operatively associated with the positioning head, and wherein each of the free plug-in connectors has at least one respective guide surface with a distance from a cooperating guide surface of the other plug-in connector along a common plug-in axis of the plug-in connectors decreases continuously from an insertion position towards a plug-in position; and wherein the guide surfaces of at least one plug-in connector are inclined between 1.5 and 4° with respect to the common plug-in axis in the plug-in position.

* * * * *